UNITED STATES PATENT OFFICE.

JOSEF WEBER, OF ESSEN-ON-THE-RUHR, GERMANY, ASSIGNOR TO GOLDSCHMIDT DETINNING COMPANY, OF NEW YORK, N. Y., A CORPORATION OF NEW JERSEY.

PROCESS OF REMOVING ZINC FROM ZINC-COATED MATERIAL.

1,122,340.  Specification of Letters Patent.  Patented Dec. 29, 1914.

No Drawing.  Application filed June 25, 1910. Serial No. 568,795.

*To all whom it may concern:*

Be it known that I, JOSEF WEBER, a subject of the King of Prussia, German Emperor, and a resident of Essen-on-the-Ruhr, in the German Empire, have invented a new and useful Process of Removing Zinc from Zinc-Coated Material, of which the following is an exact specification.

My invention relates to a process of removing zinc from zinc-coated material, especially zinc-coated iron in the form of sheet material, and the main object of the invention is to effect a more perfect separation of the zinc from the other material more economically than has heretofore been possible.

The principal material from which it has for a long time been desirable to recover zinc in as pure a state as possible is zinc-coated iron in sheet form. Many efforts have been made heretofore to remove zinc from zinc-coated material for the purpose of recovering the zinc in solution and the other material in the form of black sheet scrap. In all of the processes that have been proposed for this purpose, however, the great drawbacks have been that in addition to the zinc a considerable amount of the iron has been dissolved by the reagent used and that the black sheet scrap is left by the reagent in such condition that it afterward becomes considerably corroded. Because of this action of the reagent on the iron much of the solution was wasted and it was very troublesome, expensive and attended with great losses of the zinc content to remove the iron from such solution, as the precipitated iron, even though very carefully washed would always contain a considerable amount of zinc. The solution obtained by the processes heretofore practised for recovering zinc from zinc coated material have always contained about 20 per cent. of zinc and from 5 to 7 per cent. of iron.

The present invention is designed to avoid all the above recited drawbacks which have heretofore attended the recovery of zinc from such material, and its essential feature is the employment of a solvent of zinc which has no acid reaction or is preferably neutral or even strongly basic and is substantially not a solvent of iron. Such a solvent can not be hydrochloric acid or any other acid solution that will readily attack iron. It is preferably a neutral or basic solution of chlorid of zinc. Such a solution of chlorid of zinc possesses the property of dissolving only the zinc present in the scrap and does not attack the iron on which the zinc forms a coating. This property is made use of in the present process to effect a more perfect separation of the zinc from the iron of zinc scrap than has been possible with the acid solutions heretofore used.

Theoretically chlorid of zinc should contain a little over 26 per cent. of chlorin to a little less than 24 per cent. of zinc, this being the ratio of zinc and chlorin in the ordinary solution of chlorid of zinc. According to the present invention a solution of chlorid of zinc is used in which the ratio of chlorin to the zinc is about 1 per cent. less than in the theoretical formula. By so varying the ratio of chlorin to the zinc probably basic chlorids of zinc will be formed. Such a solution as this will dissolve only the zinc present in the scrap and will not substantially attack the iron from which the zinc is to be removed. When the scrap is subjected to the action of such a basic solution of chlorid of zinc the reaction may be continued until the solution is enriched by the zinc to such an extent that the resulting solution is basic to the extent of three or even four per cent. By employing such a solution only a small quantity of iron is dissolved and it is most probable that the iron of the sheet-iron proper is not attacked and that only the iron in the thin layer of iron-zinc alloy between the zinc coating and the sheet metal proper is dissolved by the action of this basic solution. It may be said that when such a neutral or basic solution is employed as the solvent of zinc only about four-tenths of one per cent. of iron will be dissolved, that is, only one per cent. when calculated with respect to the solution, this amount being only one-fifth to one-seventh of that which is dissolved in practising the acid processes of removing zinc from zinc scrap employed up to the present time. That the main body of the iron, as distinguished from the zinc-iron alloy in the sheet-metal is not attacked by the action of such a neutral or basic solvent of zinc is also clearly indicated by the fact that the process of recovering zinc from zinc scrap when such a solution is used may be carried out in iron vessels or tanks without the least corrosion of the iron walls being observable. This is of great practical importance, for in carrying out the process on a commercial scale this process has a very considerable advantage over the old process of recovering zinc by means of acid solutions, which processes it was impossible to carry out in iron vessels or tanks because the acid solution was a solvent of iron and readily attacked it.

In order that the process may be fully understood the following description is given of the manner in which it is usually practised. The zinc scrap or other zinc-coated material is usually first put into perforated drums. While in these it is cleaned, if necessary, to remove non-metallic foreign matter. It may also be subjected to a process of removing the solder therefrom, which may be done by heating it up to a temperature sufficient to cause the solder to run. Mechanical motion may also be employed in connection with this heating to facilitate the removal of such solder. When in proper condition the zinc-coated material is placed in the dezincing solution. This solution, as used in practice, is best composed in such a way as to contain, say, about twenty-four parts by weight of zinc to about twenty-five parts of chlorin instead of the theoretical amount of chlorin, which is a little over twenty-six parts. This basic zinc-containing de-zincing solution is usually heated and is preferably maintained at or above boiling, and each drum containing the zinc-coated material is preferably rotated in the bath until the ebullition of hydrogen due to the reaction upon and dissolving of the zinc entirely ceases. It is advantageous to employ such an amount of the solvent that at the end of the reaction the solution will have a basicity of from two to three per cent., according as the material contains a smaller or a greater amount of zinc. The solution resulting from the employment of such a reagent is in such a condition as to permit the iron present, which is in the form of protochlorid of iron, to be precipitated readily. This may be accomplished by any proper means, oxidization by means of chlorate of sodium or chlorid of lime being usually effected. After each operation a part of the bath is permitted to flow off and to the remaining portion is added such an amount of hydrochloric acid and wash-water that the resulting solution has a basicity of about one per cent. and contains about 24 per cent. of zinc. By the addition of this acid (and wash-water) the solution is regenerated and is made ready for immediate use for dezincing another charge.

When the process of removing the zinc from the zinc-coated material is finished the drums with their contents are lifted out of the bath and are washed one or more times with water in order to remove the solution of chlorid of zinc still adhering to the scrap. These washing baths are generally used to fill up the de-zincing solution, but they may be evaporated, precipitated or used in any other way.

For the purpose of illustrating how the process is practised commercially the following will serve as an example: A drum containing about one ton of zinc-coated material (which in turn has an average zinc content of about 10 per cent.), is placed in a bath of 6 cubic meters of a solution of chlorid of zinc containing about 24 per cent. of zinc to about 25 per cent. of chlorin. That is to say, the solution will have a basicity of about one per cent. The reaction is permitted to proceed until the zinc is removed from the material, when the solution will ordinarily have a basicity of about three per cent. In order to restore it to its original condition or to a condition in which it is capable of removing zinc again from scrap, from 350 to 400 kilos of commercial hydrochloric acid are added to the bath.

What I claim is:

1. The process of removing zinc from zinc-coated material, which consists in subjecting said material to the action of a solvent of zinc which has no acid reaction.

2. The process of removing zinc from zinc-coated material, which consists in subjecting said material to the action of a liquid solvent of zinc which has no acid reaction.

3. The process of removing zinc from zinc-coated material, which consists in subjecting said material to the action of a liquid zinc-containing solvent of zinc which has no acid reaction.

4. The process of removing zinc from zinc-coated material, which consists in subjecting said material to the action of a basic solvent of zinc.

5. The process of removing zinc from zinc-coated material, which consists in subjecting said material to the action of a solution of chlorid of zinc which has no acid reaction.

6. The process of removing zinc from zinc-coated material, which consists in subjecting said material to the action of a basic solution of chlorid of zinc.

7. A process of removing zinc from zinc-coated iron, which consists in subjecting said material to the action of a solvent of zinc which is substantially not a solvent of iron.

8. A process of removing zinc from zinc-coated iron, which consists in subjecting said material to the action of a liquid solvent of zinc which is substantially not a solvent of iron.

9. A process of removing zinc from zinc-coated iron, which consists in subjecting said material to the action of a zinc-containing solvent of zinc which is substantially not a solvent of iron.

10. A process of removing zinc from zinc-coated iron, which consists in subjecting said material to the action of a liquid zinc-containing solvent of zinc which is substantially not a solvent of iron.

11. A process of removing zinc from zinc-coated iron, which consists in subjecting said material to the action of a liquid solvent of zinc which is substantially not a solvent of iron and which has no acid reaction.

12. A process of removing zinc from zinc-coated iron, which consists in subjecting said material to the action of a basic liquid solvent of zinc which is substantially not a solvent of iron.

13. The process of removing zinc from zinc-coated material, which consists in subjecting said material to the action of a solvent of zinc which has no acid reaction, and reducing the resulting basicity of said solvent to fit it for re-use.

14. The process of removing zinc from zinc-coated material, which consists in subjecting said material to the action of a basic solvent of zinc, and reducing the resulting basicity of said solvent to fit it for re-use.

15. The process of removing zinc from zinc-coated iron which consists in subjecting said material to the action of a basic solvent of zinc, and precipitating any iron present in the resulting basic solution.

16. The process of removing zinc from zinc-coated iron which consists in subjecting said material to the action of a basic solvent of zinc, and subjecting any iron present in the resulting basic solution to direct oxidization.

17. The process of removing zinc from zinc-coated iron, which consists in subjecting said material in an iron vessel to the action of a basic solvent of zinc which does not attack the iron of said vessel.

18. The process of removing zinc from zinc-coated material which consists in subjecting said material to the action of a solution of zinc chlorid containing about 24 per cent. of zinc to about 25 per cent. of chlorin.

In witness whereof I have hereunto set my hand in the presence of two witnesses.

JOSEF WEBER. [L. S.]

Witnesses:
OTTO KÖNIG,
CHAS. J. WRIGHT.